United States Patent [19]

Gram

[11] Patent Number: 4,839,185
[45] Date of Patent: Jun. 13, 1989

[54] METHOD AND APPARATUS FOR DEPOSITING A CONTINUOUSLY EXTRUDED FORMATION UPON A CONTINUOUSLY DRIVEN CONVEYOR

[75] Inventor: Klaus Gram, Vojens, Denmark

[73] Assignee: Gram, Brodrene A/S, Vojens, Denmark

[21] Appl. No.: 194,177

[22] Filed: May 16, 1988

[30] Foreign Application Priority Data

May 26, 1987 [DK] Denmark ............................ 2694/87

[51] Int. Cl.$^4$ .......................... A23G 9/14; A23P 1/00
[52] U.S. Cl. ...................................... 426/512; 83/285; 425/308; 425/312; 425/315; 426/517; 426/518
[58] Field of Search ............... 426/515, 512, 524, 518, 426/516, 517; 425/377, 371, 372, 308, 310, 312, 315; 83/155.1, 285, 356.2, 713, 732

[56] References Cited

U.S. PATENT DOCUMENTS

| | | | |
|---|---|---|---|
| 2,535,231 | 12/1950 | Rasmusson | 426/515 |
| 4,210,237 | 7/1980 | Gram | 198/425 |
| 4,477,473 | 10/1984 | Schoonmaker et al. | 426/515 |

*Primary Examiner*—George Yeung
*Attorney, Agent, or Firm*—Watson, Cole, Grindle & Watson

[57] ABSTRACT

A method serves to deposit a continuously extruded formation or string of an edible product, such as an ice cream formation upon a continuously driven conveyor for a plant for treating the product. In order to be able to deposit the formation discontinuously upon a conveyor consisting of trays, the formation is extruded upon an endless depositing band driven by means of a driving device with contant speed which is slower than the speed of the conveyor. The depositing band is driven around an end reversing location arranged above the container and the end reversing location is moved with respect to the driving device of the depositing band in the same direction as the direction of movement of the conveyor and with a speed which at least is equal to the speed with which the depositing band is driven by means of its driving device. Then the movement of the end reversing location is reversed with respect to the driving device of the depositing band and a formation portion is being deposited upon the conveyor. Then the movement of the end reversing location with respect to the driving device for the depositing band is stopped and the formation is severed at the end reversing location, whereafter the latter is moved with respect to the driving device of the depositing band as indicated, whereafter the movements mentioned as regards the end reversing location and the severing are repeated. An apparatus is provided for carrying out the method.

8 Claims, 3 Drawing Sheets

METHOD AND APPARATUS FOR DEPOSITING A CONTINUOUSLY EXTRUDED FORMATION UPON A CONTINUOUSLY DRIVEN CONVEYOR

BACKGROUND OF THE INVENTION

The present invention relates to a method for depositing a continuously extruded formation or string of an edible product, in particular an ice cream formation upon a continuously driven conveyor supported by a support, in particular a conveyor for a plant for freezing ice cream.

Methods of the kind referred to above are known, by means of which the continuously extruded formation is deposited continuously upon the continuously driven conveyor. By means of such a method it is possible to extrude formations having advantageous and interesting appearance. The nozzle through which the formation is extruded may e.g. be pivoted in order to change the direction of extrusion whereby the formation may be deposited in a sales promoting pattern. Moreover, two or more extruding nozzles may be used, whereby e.g. differently coloured ice cream may be extruded and in case the movements of the nozzles referred to above simultaneously are carried out "interesting" shapes may be achieved. Moreover, the same effect may be achieved if the speed, with which the formation is extruded, is faster than the speed of the conveyor, upon which the formation is extruded because the strings extruded thereby achieve a curled or bubbled appearance.

According to the known method the formation as mentioned is extruded continuously upon the continuously driven conveyor. However, such continuous depositing requires that the surface, e.g. the conveyor, upon which the extrusion is carried out is unbroken or at least is composed of e.g. lamellae having very narrow interspaces, seeing that the material extruded, e.g. ice cream, otherwise has a tendency to penetrate through the conveyor even if the cream should be pre-frozen to a certain degree. However, it is not always covenient to use a conveyor having a continuous surface of transportation because if so the run of the conveyor which receives the formation should be moved generally straightly. However, under such circumstances it is necessary to use a freezing apparatus or a corresponding treatment apparatus which is comparatively long, e.g. a freezing tunnel, because the conveyor cannot may make e.g. helically formed movements within the freezing plant.

Accordingly, a demand exists for the provision of a suitable method for depositing formations of the kind referred to upon discontinuous conveyors or the so called "tray conveyors", e.g. conveyors the surface of transportation of which is constituted by trays which follow each other, because such conveyor has the capability to allow the conveyor being moved e.g. along a helically formed path or along runs which are terminated by a helically formed and, as seen from above, half circular path, which continues in a further straight run for then again to move as mentioned. By using such a conveyor the plant in question for treating the formation may be made space saving seeing that it may be comparatively short, but in return with increased width and height.

SUMMARY OF THE INVENTION

Accordingly, it is the object of the present invention to provide a method of the kind referred to above, which allows a discontinuous depositing of the formation upon the conveyor, in particular in such a way that the depositing may be interrupted at the positions where "gaps" exist between the trays. However, the method according to the present invention may be also be used in all other cases where a discontinuous depositing of the formation upon the conveyor of the plant is requested, viz. in such a way that the formations in question are deposited in lengths which are ready to be sold in such a way that a later severing of a continuously deposited formation is avoided.

The method according to the present invention is characterized by the following operations:

(a) extruding the formation upon the upper run of an endless depositing band, (b) driving the upper run of the depositing band by means of a driving device with a constant speed which is slower than the speed of the conveyor, (c) driving the depositing band around an end reversing location arranged above the conveyor, (d) moving the end reversing location with respect to the driving device for the depositing band and in the same direction as the direction of movement of the conveyor and with a speed which at least is equal to the speed, with which the depositing band is driven by means of its driving device, (e) reversing the movement of the end reversing location with respect to the driving device for depositing band and depositing a portion of the formation upon the conveyor, (f) stopping the movement of the end reversing location with respect to the driving device for the depositing band and severing the formation at the end reversing location, and (g) moving the end reversing location with respect to the driving device of the depositing band as stated sub (d) and repeating the operations mentioned sub (e), (f), (g) and (d) in the order just mentioned.

By means of this method it is achieved that the formation is deposited piece by piece upon the conveyor. During the movement of the end reversing location in the direction of the conveyor and with the speed mentioned the formation deposited upon the depositing band will remain upon the depositing band. When the movement of the end reversing location then is reversed which e.g. may be carried out after "the gap" between two trays has passed the end reversing location, depositing upon the conveyor happens, which again may stop when this motion of the end reversing location stops and severing is made, which in the instance mentioned above happens before "a gap" between two trays passes the end reversing location. However, the depositing may also be continued after said movement of the end reversing location has ceased and until severing is carried out, whereby depositing will occur while the end reversing location stands still. During the following movement of the end reversing location in the direction of movement of the conveyor, the end reversing location will as mentioned move with a slower speed than the speed of transportation of the conveyor, and during this movement the "gap" in question will have the opportunity to overtake the end reversing location, whereafter depositing starts again. In this way it is achieved that the formation may be extruded continuously upon the depositing band, but nevertheless the formation extruded may be deposited in lengths as required upon the conveyor.

It should be noticed that when it sub (f) as stated above is mentioned that the movement of the end reversing location is stopped this needs only to mean that the direction of movement of the end reversing location is reversed during which a very short stopping of the end reversing location will occur which, however, is sufficient for the severing of the formation in question and for the depositing of the cut end upon the conveyor. Moreover, it should be mentioned that it, of course, also is possible to use the method for depositing formations piece by piece upon conveyors even though the conveyors are not tray conveyors, viz. if it is requested that the formation is divided into the lengths requested before the treatment, e.g. the freezing.

However, according to the present invention it is preferred to carry out the severing immediately after the end reversing location has finished its movement in direction opposite to the direction of movement of the conveyor, and that the end reversing location immediately after the severing is moved in the direction of movement of the conveyor. Thereby, it is namely achieved that the following formation portion will be deposited evenly upon the conveyor. During the depositing movement, the formation portion deposited will be stretched uniformly and such stretching will correspond to the depositing time, viz. the time it takes for the end reversing location to carry out the reversing movement referred to multiplied with the difference between the speed of the conveyor and the speed of the depositing band. Moreover, such stretching may be made very small if the withdrawal or reversing movement of the end reversing location is carried out with a speed which is high compared with the speed of the conveyor and the speed of the depositing band.

From the explanation given above it will be understood that the speed with which the end of a formation portion just cut will move corresponds to the speed of the conveyor and that the speed with which the end of the formation lying on the depositing band will move is equal to the difference between the speed of the conveyor and the speed of the depositing band. If this difference is great the rear end of a formation portion just cut will move rapidly away from the end of the formation lying upon the depositing band, and when a new cut formation portion is being deposited, the distance between such portion and the previously deposited formation portion will be comparatively long. This may result in an uneconomical use of the length of the conveyor. In order to achieve a fast removal of the cutting surfaces formed by the severing from each other without using a comparatively great difference between the speed of the conveyor and the speed of the depositing band an embodiment of the method may be used, which is characterized by moving the depositing band, the driving device therefor and the end reversing location comparatively fast in the direction opposite the direction of movement of the conveyor and with respect to the stand of the conveyor after the severing mentioned sub (f) a distance which is sufficient for separating the cutting surfaces formed by the severing, whereafter said parts of the apparatus are moved in the direction of movement of the conveyor with respect to the stand thereof the same distance, but comparatively slower during the operation mentioned sub (d). As mentioned above thereby a fast separation of the cutting surfaces is achieved due to the superimposing of the comparatively fast movement for which there then is compensated, viz. during the following movement of the end reversing location in the direction of movement of the conveyor and, accordingly, while no depositing is made.

In order to achieve the specific depositing shapes referred to above the material from which the formation is formed, may according to the invention be extruded with a higher speed than the speed of the depositing band and/or the material may be extruded in a direction which varies during the extrusion or different materials may be extruded through more nozzles simultaneously.

The invention also rotates to an apparatus for depositing a continuously extruded formation, in particular an ice cream formation upon a continuously driven conveyor supported by a stand, in particular a conveyor for a plant for freezing ice cream, said apparatus comprising a frame adapted to be arranged upon the stand and supporting at least one nozzle for extruding the formation. According to the present invention the apparatus is characterized by the frame supporting an endless depositing band comprising an upper run above which the nozzle is arranged, said depositing band being connected with a driving device for driving the depositing band with a speed which is slower than the speed of the conveyor, said depositing band comprising an end reversing location arranged above the conveyor and connected with means for moving the end reversing location along the conveyor in the same direction as the direction of movement of the conveyor with a speed which at least is equal to the speed with which the depositing band is driven by means of its driving device to a first position, and for moving the end reversing location along the conveyor and in the opposite direction to a second position, said apparatus, moreover, comprising means for servering the formation at said second position of the end reversing location.

In order to achieve the fast removal referred to above of the cutting surfaces formed by the severing away from each other the apparatus according to an embodiment of the invention is characterized by the frame with the nozzle, the depositing band, the driving device for the depositing band and the means for moving the end reversing location are supported by the stand by means of a carriage, means being arranged between the carriage and the stand for moving the carriage against and in the direction of movement of the conveyor, said means being synchronized in such a way with the moving means for the end reversing location that the carriage is moved against the direction of movement of the conveyor, when the end reversing location is positioned at its said second position.

DESCRIPTION OF THE PREFERRED EMBODIMENT

Figure 1:
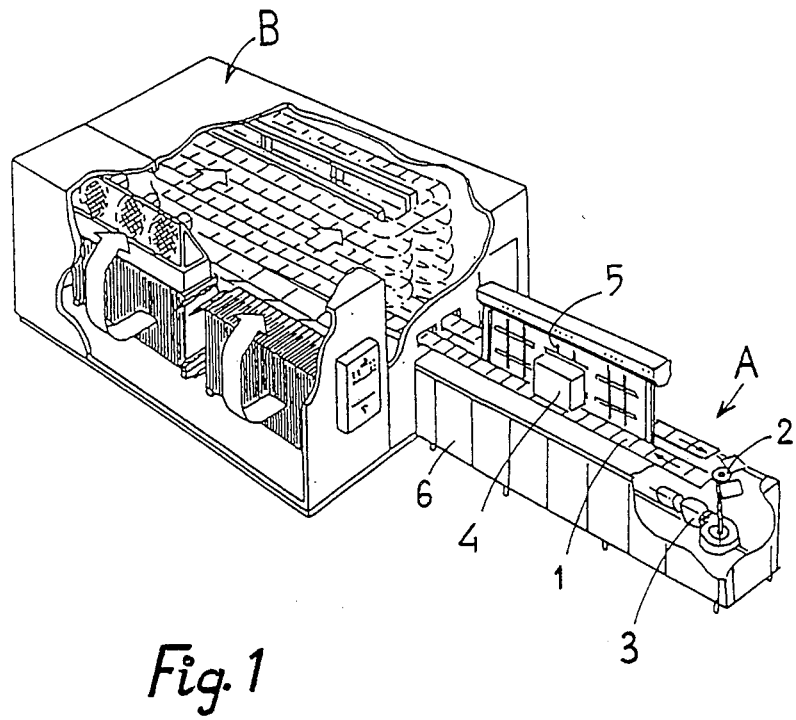
FIG. 1 shows an embodiment of a freezing plant comprising an embodiment of the depositing apparatus according to the invention, FIG. 2 schematically and in perspective shows an embodiment of the depositing apparatus according to the invention.

The plant shown in FIG. 1 comprises an entrance station A and a freezing section B. The articles to be frozen are being arranged at the entrance station A upon a conveyor 1, which according to the embodiment shown is in the form of a tray conveyor, i.e. trays which are loose with respect to each other and are connected to a chain in such a way that the conveyor in question may be moved along bays. Such bays are indicated in the freezing section B. When the inlet run of the conveyor 1 moves into the freezing section B the run is moved along a first oval, helically shaped path along which the run moves alternatively along straight paths and rounded end reversing paths so that the conveyor is moved upwardly. When the conveyor has reached the upper winding in the first oval helically shaped path it moves over to the other path, whereafter the conveyor is moved downwardly for leaving the freezing section through an exit therein, and then the conveyor passes a driving sprocket 2 driven by a drive unit 3, whereafter the conveyor on its way into the freezing section B passes below an embodiment of the apparatus according to the present invention which generally is designated 4, and which is only shown symbolically in the form of a box. The apparatus 4 is supported by means of a frame 5 supported by a stand 6 which also serves for the mounting of the drive unit 3.

Figure 2:
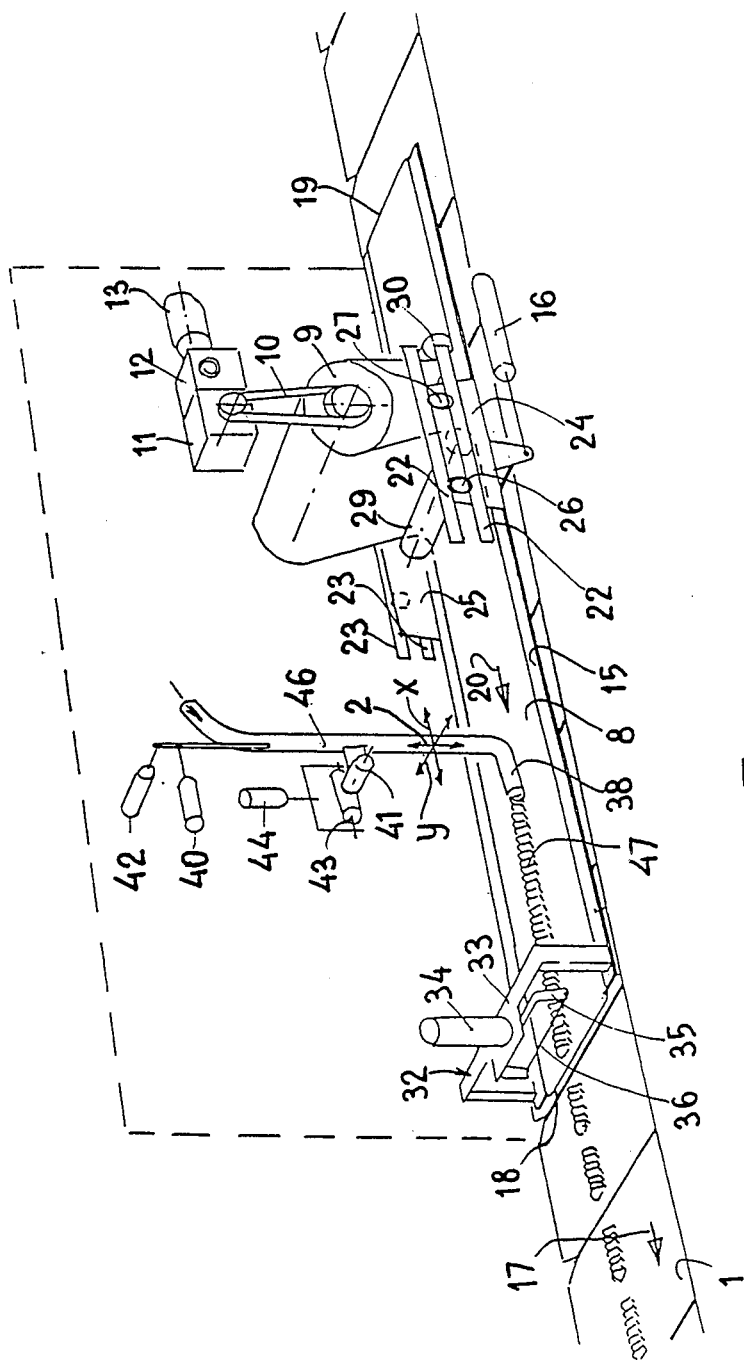

In FIG. 2 the depositing apparatus is shown schematically and in perspective and only the parts necessary for the understanding of the present invention are shown. The apparatus comprises an endless depositing band 8 driven by means of a driving device in the form of a driving roller. The roller is driven by means of a belt drive 10 from a bevel gear 11 driven by a variable gear 12 drawn by a motor 13. The endless band 8 is conducted along a great flat bay around a sliding plate 15 which by means of a moving device 16 in the form of a jack may be shifted with respect to the frame 5 which is not shown in FIG. 2, but which support the endless depositing band with the corresponding drive arrangement. By means of the jack 16 the sliding plate 15 may be moved to and fro in its longitudinal direction which extends generally parallel with the direction of transportation of the conveyor 1. The direction of transportation of the conveyor 1 is indicated in FIG. 2 by means of an arrow 17. Accordingly, the band 8 extends between two end reversing locations 18 and 19, viz. corresponding to the front edge and the rear edge respectively, of the sliding plate 15. Said end reversing locations are indicated schematically in FIG. 2, but it will be understood that between the edges referred to of the sliding plate 15 and the depositing bands rollers may be arranged in order to facilitate the passage of the band around the end edges in question.

The driving device 9 drives the depositing band 8 with a constant speed indicated by means of an arrow 20, and this constant speed is slower than the speed with which the conveyor 1 is driven. The sliding plate 15 is shiftably supported with respect to the driving device for the depositing band 15 by means of two pairs of guiding ways 22,22 and 23,23, respectively, seeing that the sliding plate 15 comprises a pair of side plates 24,25 each having two rollers 26,27 guided by means of the pairs of guiding ways. Between the side pieces 24 and 25 a pair of guiding rollers 29 and 30, moreover, are arranged which provide for the wrapping necessary of the depositing band 8 around the driving roller 9, and which simultaneously guide the depositing band in such a way that it will move closely adjacent the upper surface of the sliding plate 15, which will also be the case along the lower surface of the plate.

Adjacent the end reversing location 18 the sliding plate 15 supports a severing device 32 in the form of an inverted U-shaped bow 33, the cross part of which supports moving means in the form of an air cylinder 34. The piston rod of the air cylinder 34 extends downwardly and supports another inverted U-shaped bow 35 between the branches of which a severing thread 36 is extended.

Moreover, the frame 5 (not shown in FIG. 2) supports an extruder nozzle 38 suspended in the frame in question in the following way:

By means of an air cylinder 40, whereby the nozzle 38 may be moved around a pivot 41 in the X-direction indicated in FIG. 2; an air cylinder 42 by means of which the nozzle 38 may be moved in the Y-direction indicated about a pivot 43, and an air cylinder 44 by means of which the nozzle 38 may be moved in the Z-direction indicated directly. The nozzle 38 and the corresponding extruder tube 46 are fed with the material to be extruded as a string of an edible product, e.g. ice cream, by means of a feeding system not shown. During the operation of the apparatus a formation 47 is deposited upon the upper run of the depositing band 8 by means of the nozzle 38 and such formation may assume highly different shapes, viz. by moving the nozzle 38 in one or more of the directions indicated. Moreover, the shape of the formation may be changed by extruding the material in question with a higher speed than the speed of movement 20 of the depositing band 8. The feeeding system not shown which feeds the nozzle 38 may be suspended in the same frame 5 as may the other parts of the apparatus.

The apparatus, so far explained, operates in the following way:

The formation 47 is extruded continuously upon the band 8 and the band is moved with the constant speed 20. It is now assumed that a severing has just occurred by means of a vertical downward and upward movement of the servering thread 36 caused by means of the air cylinder 34. Such severing is carried out while the end reversing location 18 is positioned in its rearmost position, i.e. the position wherein the sliding plate 15 has been drawn as long as possible to the right in FIG. 2 by means of the jack 16. Moreover, severing is carried out immediately before a "gap" between two of the trays of the conveyor 1 passes the end reversing location 18, Thereby a portion of the formation in question has been deposited upon a tray. Now the jack 16 moves the sliding plate 15 and, accordingly, also the end reversing location 18 to the left in FIG. 2, viz. in the same direction as the movement of the conveyor 1, but with a speed which at least is equal to the speed 20 of the depositing band 8, which is slower than the speed 17 of the conveyor. Simultaneously, the speed with which the end reversing location 18 is moved to the left, of course, must not be higher than the speed 17 of the band 1, seeing that the end reversing location 18 otherwise would be driven into the portion of the formation just deposited. Accordingly, during this movement to the left of the end reversing location 18 the latter will be overtaken by the conveyor 1, and when the next "gap" between the trays has passed the end reversing location 18, the latter is moved to the right in FIG. 2 by means of the jack 16. Thereby the foremost end portion of the formation will be deposited upon the tray now positioned below the end reversing location. Such depositing will continue at least until the end reversing location 18 has reached its fully retracted position, but may continue while the end reversing location stands still. When the length of the formation required has been deposited, which may be in the case when the end reversing location has reached it fully withdrawn position or later, the severing device 32 is activated and the movement of the sliding plate 15 is again reversed. Now the formation portion just deposited will move with the speed 17 of the conveyor 1 and the end reversing location 18 will move with the slower speed explained above which at least is equal to the speed of the band 8. Thereby the cutting surfaces are moved away from each other with a speed equal to the difference between the speed of the conveyor 1 and the speed of the band 8. It is preferred to arrange the apparatus in such a way that the severing device 32 is activated immediately after the end reversing location has arrived at its fully withdrawn position for then immediately again to move the end reversing location forward in the direction of the conveyor. Thereby depositing will only occur during the withdrawal of the end reversing location and, accordingly, the formation portion deposited will be deposited equally upon the conveyor. Obviously, the portion deposited will be stretched compared with the condition of the formation upon the depositing band, viz. corresponding to the difference between the speed of the conveyor and the speed of the depositing band multiplied by the period of time the withdrawal of the end reversing location takes. However, by reducing this period of time viz. by withdrawing the end reversing location rapidly, the deformation referred to above of the formation portion deposited may be reduced to a minimum.

If the formation in question consists of ice cream, the difference of spaced between the conveyor 1 and the depositing band 8 must be comparatively high immediately after the severing in order to avoid that the cutting surfaces formed melt together. However, this simultaneously results in that the formation portions must be deposited upon the conveyor 1 with comparatively long mutual distances. This may result in a bad utilization of the capacity of the conveyor 1.

Figure 3:
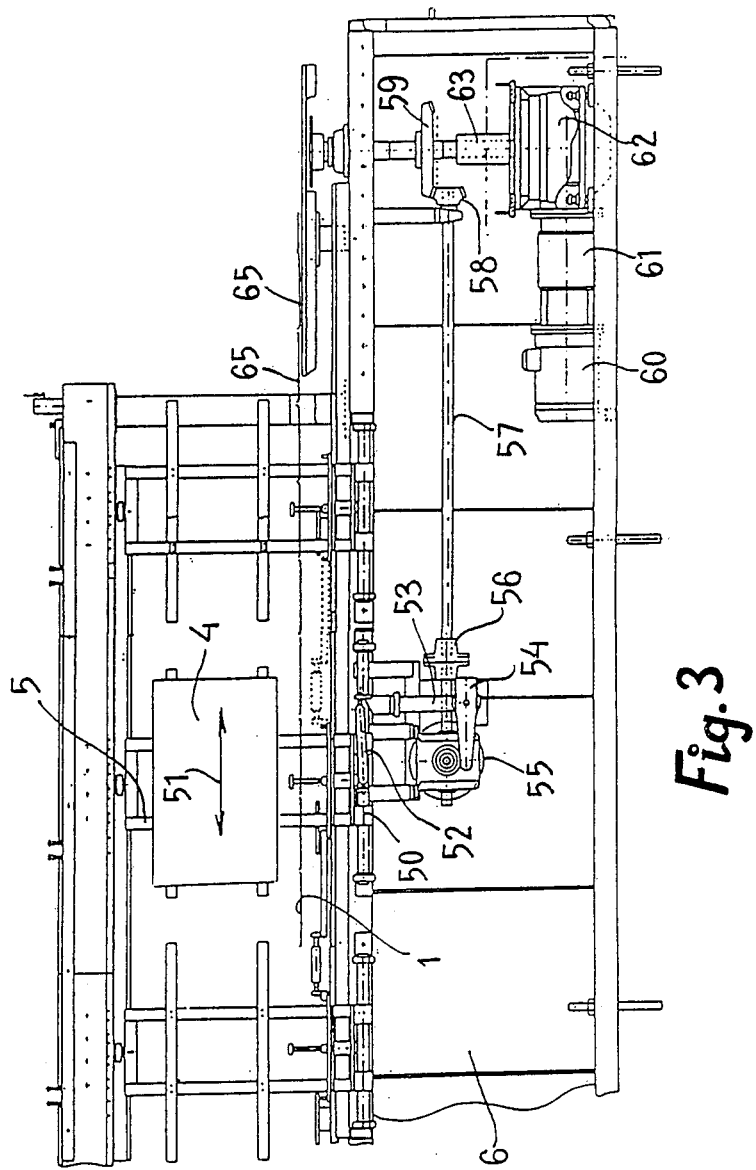
FIG. 3 shows the embodiment of the depositing apparatus shown in FIG. 2 mounted in a specific way upon the plant shown in FIG. 1.

Accordingly, it is according to the present invention proposed that the frame 5 previously explained, and accordingly, also the parts carried thereby, is supported with respect to the stand 6 by means of a carriage 50 as indicated in FIG. 3. This carriage is movably to and fro as indicated by means of the double arrow 51 in FIG. 3, viz. by means of the following driving device: A link arm 52 one end of which is connected with the carriage 50, and the other end of which is connected with one of the arms 53 of a bell lever, the other arm of which is designated 54. The latter arm cooperates with a cam disc 55 shaped in such away that it by being turned transfers a pivoting movement to the bell lever 53, 54 which is transferred by means of the link arm 52 to the carriage 50, whereby the latter is moved as indicated by means of the double arrow 51. The cam disc 55 drives via a clutch 56 a driving shaft 57 which with a bevel pinion engages with a crown wheel 59 driven by means of a motor 60 which via a gear 61 drives a bevel gear 62 connected with the crown wheel 59 by means of a shaft 63. The shaft 63 simultaneously serves for driving the driving wheel 2 of the conveyor, cf. FIG. 1, because the parts 60, 61, 62 and 63 constitute the driving unit 3 previously referred to.

In FIG. 3 the conveyor 1 is shown in the form of the tray conveyor previously referred to, the trays of which are provided with the reference numerals 65.

When the apparatus 4 is supported with respect to the stand 6 by means of the carriage 50, the apparatus operates in the following way:

Immediately after the operation of the severing device 32, the cam disc 55 moves by means of the bell lever 53,54 the carriage 50 to the right in FIG. 3 (also FIG. 2) with a comparatively high speed, whereby the cutting surfaces formed by the severing device are rapidly separated. Accordingly, this movement of the cam disc is being superimposed the movement of the sliding plate 15, and accordingly also the movement of the depositing band 20, whereby the movement of the reversing location 18 to the left in FIG. 2 previously explained and which occurs immediately after the severing is reduced or even reversed with respect to the movement of the conveyor 1. When this separation movement has occurred, the cam disc 55 moves the carriage 50 to the left in FIG. 3, and accordingly also to the left in FIG. 2, viz. during the movement of the reversing location 18 to the left in FIG. 1 as previously explained, whereby this movement, seen absolutely, will be increased, but it will be understood that the movement superimposed by means of the cam disc 55 has no influence upon the relative movements of the parts supported by the frame, i.e. the movement of the reversing location 18 with respect to the driving device 9 for the depositing band and the movement of the sliding plate 15 with respect to this driving device.

As regards the embodiment illustrated in FIG. 3 it will be understood that the feeding system in this case either may be supported by the frame 5 or may be arranged any other place.

However, in the latter case the nozzle 38 must be connected with the feeding system by means of a bendable tube, which allows the relative movement which under such circumstances occur due to the movement of the carriage caused by the cam disc. It will be understood that the apparatus shown may be provided with means for synchronizing the different movements, viz. in such a way that the severing movement and the rapid movement caused by the cam disc 55 happen simultaneously with the passage of the "gap" between two after each other following trays 65,65 past the end reversing location 18, as well as also the moving means 34 for the severing device 32 are synchronized in this respect.

Above the method and the apparatus have been explained in connection with the depositing of a single extruded formation upon the depositing band 20. Due to the fact that a conveyor as the one explained above may have a comparatively great width it will be understood that more formations may be deposited parallel with each other upon the same depositing band, and accordingly upon the same conveyor in order to utilize the full width of the depositing band 20 and of the conveyor 1.

I claim:

1. Method for depositing a continuously extruded string of an edible product upon a continuously driven conveyor supported by a stand, said conveyor serving to feed a plant for treating said product, said method comprising the following steps:
    (a) extruding the string upon the upper run of an endless depositing band, (b) driving the upper run of the depositing band by means of a driving device with a constant speed which is slower than the speed of the conveyor, (c) driving the depositing band around an end reversing location arranged above the conveyor, (d) moving the end reversing location with respect to the driving device for the depositing band and in the same direction as the direction of movement of the conveyor and with a speed which at least is equal to the speed, with which the depositing band is driven by means of its driving device, (e) reversing the movement of the end reversing lcoation with respect to the driving device of the depositing band and depositing a portion of the string upon the conveyor, (f) stopping the movement of the end reversing location with respect to the driving device for the depositing band and severing the string at the end reversing location, and (g) moving the end reversing location with respect to the driving device of the depositing band in accordance with step (d) and repeating the steps (e), (f), (g) and (d) in succession.

2. Method according to claim 1, wherein the movement of the end reversing location after the reversing thereof according to step (e) is carried out with a speed which is higher than the speed of the conveyor and of the depositing band, and the severing being carried out immediately after the stopping of the end reversing location, and said end reversing location immediately thereafter again being moved in the direction of movement of the conveyor.

3. Method according to claim 1 wherein the depositing band, the driving device therefor and the end reversing location are moved at a first speed in the direction opposite direction of movement of the conveyor and with respect to the stand of the conveyor after the severing according to step (f) a distance which is sufficient for separating the cutting surfaces formed by the severing, whereafter the depositing band, the driving device therefor and the end reversing location are moved in the direction of movement of the conveyor with respect to the stand thereof the same distance at a second speed during step (d), said first speed being faster than said second speed.

4. Apparatus for depositing a continuously extruded string of an edible product upon a continuously driven conveyor supported by a stand, said conveyor constituting a part of a plant for treating said product, said apparatus comprising a frame adapted to be arranged upon the stand and supporting at least one nozzle for extruding the string, said apparatus further comprising an endless depositing band mounted on said frame, said band comprising an upper run above which the nozzle is arranged, said depositing band being connected with a driving device for driving the depositing band with a speed which is slower than the speed of the conveyor, said depositing band comprising an end reversing location arranged above the conveyor and being connected with means for moving the end reversing location along the conveyor and in the same direction as the conveyor and with a speed which at least is equal to the speed at which the depositing band is driven by means of its driving device and to a first position and to moving the end reversing location along the conveyor and in the opposite direction to a second position, said apparatus further comprising means for severing the string at said second position of the end reversing location.

5. Apparatus according to claim 4, wherein the frame with the nozzle, the depositing band, the driving device for the depositing band and the means for moving the end reversing location are supported by the stand by means of a carriage, means being arranged between the carriage and the stand for moving the carriage against and in the direction of movement of the conveyor, said means for moving the carriage being sychronized in such a way with the moving means for the end reversing location that the carriage is moved against the direction of movement of the conveyor, when the end reversing location is positioned at its said second position.

6. Apparatus according to claim 4, wherein the end reversing location is constituted by one of the end edges of a sliding plate and the severing means is arranged at said end edge.

7. Apparatus according to claim 4 wherein the nozzle is connected with means for changing the direction of extrusion of the nozzle.

8. Apparatus according to claim 4, wherein the conveyor comprises a tray conveyor.

* * * * *